United States Patent
Bye et al.

(10) Patent No.: US 9,838,869 B1
(45) Date of Patent: Dec. 5, 2017

(54) DELIVERING DIGITAL CONTENT TO A MOBILE DEVICE VIA A DIGITAL RIGHTS CLEARING HOUSE

(71) Applicant: Sprint Communications Company L.P., Overland Park, KS (US)

(72) Inventors: Stephen James Bye, Atlanta, GA (US); Lyle W. Paczkowski, Mission Hills, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1231 days.

(21) Appl. No.: 13/860,338

(22) Filed: Apr. 10, 2013

(51) Int. Cl.
*H04W 12/06* (2009.01)
*G06Q 50/28* (2012.01)
*G06Q 20/12* (2012.01)

(52) U.S. Cl.
CPC .......... *H04W 12/06* (2013.01); *G06Q 20/123* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 6,131,024 A | 10/2000 | Boltz | |
| 6,177,860 B1 | 1/2001 | Cromer et al. | |
| 6,219,712 B1 | 4/2001 | Mann et al. | |
| 6,222,463 B1 | 4/2001 | Rai | |
| 6,363,150 B1 | 3/2002 | Bhagavath et al. | |
| 6,389,403 B1 | 5/2002 | Dorak, Jr. | |
| 6,477,180 B1 | 11/2002 | Aggarwal et al. | |
| 6,507,869 B1 | 1/2003 | Franke et al. | |
| 6,507,904 B1 | 1/2003 | Ellison et al. | |
| 6,614,893 B1 | 9/2003 | Paiz | |
| 6,651,171 B1 | 11/2003 | England et al. | |

(Continued)

FOREIGN PATENT DOCUMENTS

| | | |
|---|---|---|
| EP | 1933252 A1 | 6/2008 |
| JP | 6171245 B2 | 8/2017 |

(Continued)

OTHER PUBLICATIONS

Notice of Allowance dated Nov. 29, 2013, U.S. Appl. No. 13/440,980, filed Apr. 5, 2012.

(Continued)

*Primary Examiner* — Mamon Obeid
*Assistant Examiner* — El Mehdi Oussir

(57) ABSTRACT

Embodiments of the disclosure relate generally to methods and systems for delivering digital or media content to a mobile device and associating the digital rights for the content with an identifier of the mobile device or user of the mobile device. In some embodiments, a clearing house may store the digital rights for the content and provide authorization for delivery requests from the mobile device. In some embodiments, the mobile device may receive the content via communication with one or more of: the clearing house, a media provider, and/or a transport provider.

15 Claims, 12 Drawing Sheets

(56) References Cited

U.S. PATENT DOCUMENTS

| | | |
|---|---|---|
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,023,979 B1* | 4/2006 | Wu .................. H04M 3/5233 379/265.11 |
| 7,043,241 B1 | 5/2006 | Sladek et al. |
| 7,069,234 B1 | 6/2006 | Cornelius et al. |
| 7,127,541 B2 | 10/2006 | Govindarajulu et al. |
| 7,366,806 B2 | 4/2008 | Milenkovic et al. |
| 7,386,275 B2 | 6/2008 | Pirzada et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,316,237 B1 | 11/2012 | Felsher et al. |
| 8,332,895 B2* | 12/2012 | Nathan .................. G11B 19/025 379/88.17 |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,442,588 B2 | 5/2013 | Sims et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,498,572 B1 | 7/2013 | Schooley et al. |
| 8,504,097 B1 | 8/2013 | Cope et al. |
| 8,566,183 B1 | 10/2013 | Bonar et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,826,015 B2 | 9/2014 | Lakshminarayanan et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,868,898 B1 | 10/2014 | Van Hoof |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1* | 4/2015 | Bertz .................. G06Q 30/0633 705/26.8 |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,177,157 B2 | 11/2015 | Binder |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 9,560,519 B1 | 1/2017 | McCracken, Jr. et al. |
| 9,613,208 B1 | 4/2017 | Paczkowski et al. |
| 9,712,999 B1 | 7/2017 | Cordes et al. |
| 9,779,232 B1 | 10/2017 | Paczkowski et al. |
| 2001/0041591 A1 | 11/2001 | Carroll |
| 2002/0002468 A1* | 1/2002 | Spagna .................. G06F 21/10 713/193 |
| 2002/0007456 A1* | 1/2002 | Peinado .................. G06F 21/10 713/164 |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0092435 A1 | 5/2003 | Boivin |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Ringborg et al. |
| 2004/0264372 A1 | 12/2004 | Huang |
| 2005/0015601 A1 | 1/2005 | Tabi |

(56) References Cited

U.S. PATENT DOCUMENTS

| | | |
|---|---|---|
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1* | 1/2006 | Khedouri ......... G06F 17/30038 386/234 |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro, II |
| 2007/0143210 A1 | 6/2007 | Yeung et al. |
| 2007/0150730 A1 | 6/2007 | Conti |
| 2007/0156850 A1 | 7/2007 | Corrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1* | 2/2008 | Ginter ..................... G06F 21/10 713/194 |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0281953 A1 | 11/2008 | Blaisdell |
| 2008/0304640 A1 | 12/2008 | Reilly |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |
| 2009/0275364 A1 | 11/2009 | Morel et al. |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0190469 A1 | 7/2010 | Vanderveen et al. |

(56) References Cited

U.S. PATENT DOCUMENTS

| | | |
|---|---|---|
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Floreck et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0166806 A1 | 6/2012 | Zhang et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1 | 11/2012 | Micali et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |

(56) References Cited

U.S. PATENT DOCUMENTS

| | | |
|---|---|---|
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani Rita et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0033316 A1 | 1/2014 | Paczkowski et al. |
| 2014/0047548 A1 | 2/2014 | Bye et al. |
| 2014/0052562 A1* | 2/2014 | Oliveira ............. G06Q 30/0643 705/26.5 |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0200051 A1 | 7/2014 | Liu |
| 2014/0215196 A1 | 7/2014 | Berlin |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0032976 A1 | 1/2015 | Chapier et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |
| 2016/0004876 A1 | 1/2016 | Bye et al. |
| 2016/0142396 A1 | 5/2016 | McRoberts et al. |

FOREIGN PATENT DOCUMENTS

| | | |
|---|---|---|
| WO | WO2011025433 A1 | 3/2011 |
| WO | WO2012064171 A1 | 5/2012 |
| WO | WO2012085593 A1 | 6/2012 |
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.

(56) References Cited

OTHER PUBLICATIONS

Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee. org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore. ieee. org/stamp/stamp.jsp?tp=&arnumber=1617569.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
First Action Interview Office Action dated Apr. 7, 2015, U.S. Appl. No. 13/802,404, filed Mar. 13, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.

(56) References Cited

OTHER PUBLICATIONS

FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Paczkowski, Lyle W., et al., "Trusted Code Generation and Verification to Prevent Fraud from Maleficent External Devices that Capture Data," filed Jan. 14, 2015, U.S. Appl. No. 14/596,218.
Notice of Allowance dated May 29, 2015, U.S. Appl. No. 14/085,474, filed Nov. 20, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Final Office Action dated Aug. 27, 2015, U.S. Appl. No. 13/802,404, filed Mar. 13, 2013.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Final Office Action dated Nov. 6, 2015, U.S. Appl. No. 14/632,850, filed Feb. 26, 2015.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
Notice of Allowance dated Sep. 21, 2015, U.S. Appl. No. 14/148,714, filed Jan. 6, 2014.
Notice of Allowance dated Nov. 9, 2015, U.S. Appl. No. 14/659,614, filed Mar. 17, 2015.
Advisory Action dated Nov. 16, 2015, U.S. Appl. No. 13/802,404, filed Mar. 13, 2013.
FAIPP Pre-Interview Communication dated Nov. 18, 2015, U.S. Appl. No. 14/681,077, filed Apr. 7, 2015.
Office Action dated Nov. 19, 2015, U.S. Appl. No. 13/857,139, filed Apr. 4, 2013.
Foreign Communication from a Related Counterpart—International Preliminary Report on Patentability, dated Sep. 24, 2015, PCT/US14/16651, filed on Feb. 16, 2014.
Bye, Stephen James, et al., "Systems and Methods for Provisioning and Using Multiple Trusted Security Zones on an Electronic Device," filed Sep. 15, 2015, U.S. Appl. No. 14/855,364.
Advisory Action dated Jan. 29, 2016, U.S. Appl. No. 14/632,850, filed Feb. 26, 2015.
FAIPP Pre-Interview Communication dated Mar. 1, 2016, U.S. Appl. No. 13/863,376, filed Apr. 15, 2013.
Notice of Allowance dated Feb. 26, 2016, U.S. Appl. No. 13/844,282, filed Mar. 15, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Dec. 17, 2015, U.S. Appl. No. 13/857,141, filed Apr. 4, 2013.
Dietrich, Kurt, et al., "Implementation Aspects of Mobile and Embedded Trusted Computing," Institute for Applied Information Processing and Communications, Trusted Computing Interaction Conference, 2009.
McRoberts, Leo Michael, et al., "End-to-End Trusted Communications Infrastructure," filed Jan. 25, 2016, U.S. Appl. No. 15/005,123.
Cordes, Kevin R., et al., "Digest of Biographical Information for an Electronic Device with Static and Dynamic Portions," filed Mar. 14, 2016, U.S. Appl. No. 15/069,921.
European Examination Report dated Mar. 3, 2016, EPC Application Serial No. , filed on.
Notice of Allowance dated May 2, 2016, U.S. Appl. No. 13/863,376, filed Apr. 15, 2013.
Office Action dated May 17, 2016, U.S. Appl. No. 13/802,404, filed Mar. 13, 2013.
First Action Interview Office Action dated Mar. 28, 2016, U.S. Appl. No. 14/681,077, filed Apr. 7, 2015.
Notice of Allowance dated Mar. 26, 2016, U.S. Appl. No. 13/857,139, filed Apr. 4, 2013.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.

(56) References Cited

OTHER PUBLICATIONS

Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
European Examination Report dated Jun. 1, 2016, EPC Application Serial No. 14775613.4, filed on Jul. 8, 2015.
Notice of Allowance dated Aug. 24, 2016, U.S. Appl. No. 13/912,190, filed Jun. 6, 2013.
FAIPP Pre-Interview Communication dated Aug. 8, 2016, U.S. Appl. No. 14/596,218, filed Jan. 14, 2015.
Notice of Allowance dated Jun. 15, 2016, U.S. Appl. No. 14/681,077, filed Apr. 7, 2015.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.
Hamdare, Safa, et al., "Securing SMS Based One Time Password Technique from Man in the Middle Attach," IJETT, vol. 11 Issue 3, May 2014.
Examinees Answer dated Nov. 16, 2016, U.S. Appl. No. 14/632,850, filed Feb. 26, 2015.
Notice of Allowance dated Nov. 18, 2016, U.S. Appl. No. 13/802,404, filed Mar. 13, 2013.
FAIPP Pre-Interview Communication dated Oct. 5, 2016, U.S. Appl. No. 15/069,921, filed Mar. 14, 2016.
McCracken, Billy Gene, Jr., et al. "Mobile Communication Device Profound Identity Brokering Framework", filed Nov. 30, 2016, U.S. Appl. No. 15/365,934.
FAIPP Pre-Interview Communication dated Mar. 21, 2017, U.S. Appl. No. 14/855,364, filed Sep. 15, 2015.
European Examination Report dated Feb. 14, 2017, EPC Application Serial No. 14775613.4, filed on Jul. 8, 2015.
FAIPP Office Action dated Apr. 5, 2017, U.S. Appl. No. 14/596,218, filed Jan. 14, 2015.

(56) References Cited

OTHER PUBLICATIONS

Notice of Allowance dated Mar. 10, 2017, U.S. Appl. No. 15/069,921, filed Mar. 14, 2016.
Notice of Allowance dated Jul. 6, 2017, U.S. Appl. No. 14/855,364, filed Sep. 15, 2015.
Japanese Decision for Grant dated Jun. 6, 2017, JP Application Serial No. 2015-524404.
FAIPP Pre-Interview Communication dated Apr. 27, 2017, U.S. Appl. No. 14/606,011, filed Jan. 26, 2015.
Notice of Allowance dated May 30, 2017, U.S. Appl. No. 14/596,218, filed Jan. 14, 2015.
Twin Connect—"User Guide for Windows"; 30 pages; dated 2013.
WiseGEEK,"What is a USB Dongle?," http://www.wisegeek.com/what-is-a-usb-dongle.htm, four pages, dated Jul. 25, 0017.
Decision on Appeal dated Sep. 15, 2017, U.S. Appl. No. 14/632,850, filed Feb. 26, 2015.
European Examination Report dated Sep. 20, 2017, EPC Application Serial No. 14775613.4, filed on Jul. 8, 2015.
Notice of Allowance dated Aug. 7, 2017, U.S. Appl. No. 14/606,011, filed Jan. 26, 2015.
Marquardt, Ronald R., et al., "Data Link Layer Trust Signaling in Communication Network," filed Jul. 11, 2017, U.S. Appl. No. 15/646,842.

* cited by examiner

DELIVERING DIGITAL CONTENT TO A MOBILE DEVICE VIA A DIGITAL RIGHTS CLEARING HOUSE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications may carry a wide variety of digital content, for example media content or files, electronic mail, medical records, financial transactions, and other confidential information. The electronic communications may travel for some of the communication end-to-end path over unsecured communication links where the content may be subject to tampering or intrusion. A variety of security measures have been applied to provide increased security and to raise the level of difficulty for nefarious actors attempting to access the confidential information. Confidential information may include multimedia content which may be communicated and stored on various devices.

SUMMARY

In an embodiment, a method for delivering digital content is disclosed. The method comprises: receiving by a digital content distribution system a request from an mobile device for delivery of digital content, wherein the request comprises an identification of a subscriber, a token, or an identity of the mobile device; verifying the authorization for delivery of the digital content, wherein the authorization is associated with the identification of the subscriber, the token, or the identity of the mobile device; if the requested delivery is not authorized, billing a communications service subscription account associated with the mobile device for a right to access the digital content; determining one or more digital content transport options; providing the digital content transport options to the mobile device; receiving a selection of one or more of the digital content transport options; billing the communications service subscription account for transport; and transporting the digital content to the mobile device in accordance with the selected digital content transport option, wherein delivering content is bifurcated into authorizing access to the content based on a digital rights management solution and delivering the content, wherein a user may be charged separately for the digital rights to access the content and for the transport of the content to his or her device.

In an embodiment, a method for transporting media content to a mobile device is disclosed. The method comprises: requesting delivery of the media content from a clearing house, wherein the clearing house stores digital rights for media content associated with one or more identifier; providing the one or more identifier to the clearing house, wherein the clearing house verifies that the digital rights for the media content are associated with the identifier or token; presenting options for delivery of the media content, wherein the options comprise one or more of: media providers, transport providers, cost associated with delivery, form of delivery, and time frame associated with delivery; receiving a selection of one or more option for delivery of the media content; and transporting the media content to the mobile device.

In an embodiment, a method for transporting digital content to a mobile device is disclosed. The method comprises: receiving by a distributor a request for delivery of digital content to a mobile device; confirming that the rights for the digital content are associated with the mobile device; presenting options for delivery from the distributor, wherein the options comprise media providers, transport providers, cost associated with delivery, form of delivery, and time frame associated with delivery; receiving a selection of one or more option for delivery, wherein the distributor facilitates payment associated with the chosen option; and transporting the media content to the mobile device, wherein the distributor facilitates the transport process.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
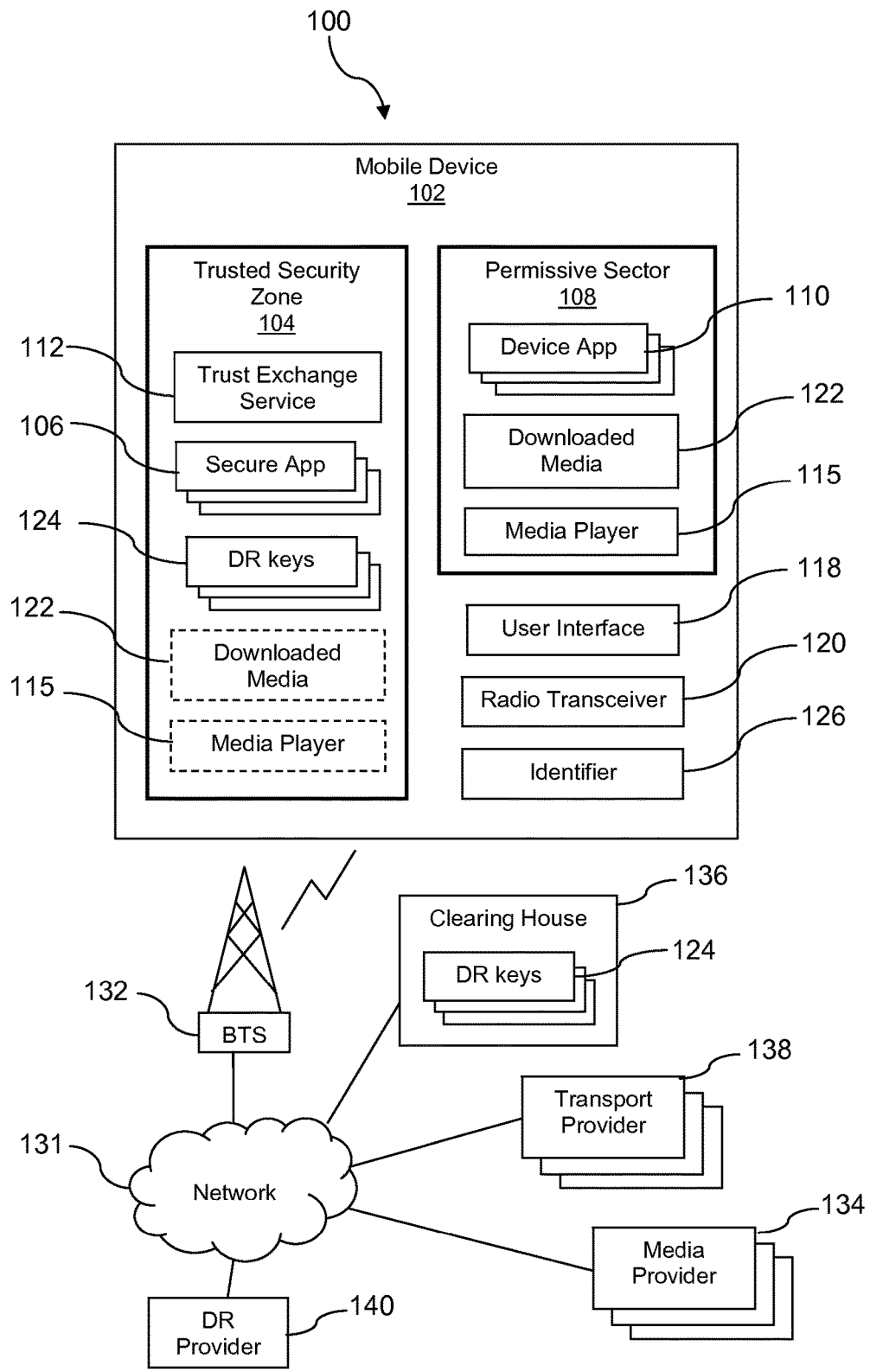
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for managing digital rights and delivering digital content to a mobile device. In some cases, digital content may comprise media content such as a movie, a song, an album, a video or computer game, a photo, or other similar media, wherein the media content may be accessed by obtaining digital rights to the content. Additionally, digital content may comprise medical records, government data, performance metrics, or other similar secure data, where the records or data may be associated with (and protected by) rights for access.

In some cases, a user may request that digital (or media) content be delivered to a mobile device. Delivery may include downloading the content or streaming the content to the device. The mobile device may be operable to present the digital content, such as via a user interface or media player. In some cases, the mobile device may communicate with a clearing house (or digital content distribution system), where the clearing house may verify that the mobile device is authorized to receive the requested digital content. For example, the clearing house may be operable to store digital rights (or digital rights keys) for the digital content, where the digital rights are associated with one or more identifier for a user and/or mobile device. The mobile device may communicate the identifier to the clearing house as a part of the request for the digital content. If the digital rights for the requested content are associated with the identifier, the delivery may be authorized. If the digital rights for the requested content are not associated with the identifier, the delivery may not be authorized until a transaction has been completed to purchase or obtain the digital rights. In other cases, the digital rights may be stored on the mobile device, where the mobile device may provide indication of the digital rights, such as a key or token, to the clearing house to authorize the delivery of the digital content. In some cases, the digital rights may be stored in a trusted security zone on the mobile device.

Once the delivery is authorized, the clearing house may then facilitate the delivery of the digital content to the mobile device and may communicate with one or more media provider (or digital content data store) and/or transport provider to complete the delivery. Options may be provided to the user of the mobile device for selecting among available media providers and transport providers. Additionally, options may comprise cost associated with delivery, forms of delivery, and time frames associated with delivery, where the selection of options may be communicated to the clearing house. In some cases, the mobile device may communicate with the selected media provider via the selected transport provider.

In some cases, delivering the content to the mobile device may be bifurcated into authorizing access to the content based on a digital rights management solution and delivering the content, and a user may be charged separately for the digital rights to access the content and for the transport of the content to his or her device. This may allow separate entities to participate in the delivery of the content and may also allow the user to choose between different forms or pathways of transport based on the cost of transport. Additionally, the bifurcation of the delivery may allow for the content to be delivered multiple times to multiple devices without the user being charged for the digital rights every time the user wishes to access the content, but the user may be charged for each transport of the content to a mobile device. In some cases, charging the user for transport may be completed for one of more of the following: a one-time transport, a set number of transports, a set time frame for transports, transport to one device, and transport to a set number of devices. Additionally, a user may have a subscription or account with a transport provider, and transport of the content may be handled (or paid for) through that subscription or account. These innovative functionalities can provide enhanced flexibility that may promotes new business opportunities and business models as well as greater end user functionality.

In some cases, a user may request that the digital content be delivered to a second mobile device, different from the mobile device that originally received the digital content. The mobile device may provide an identifier associated with the user of the mobile device to the clearing house, where the clearing house may verify that the identifier is associated with the digital rights for the requested digital content. If the identifier is verified, the clearing house may then facilitate delivery or transport of the digital content to the mobile device, as described above. In other cases, the user may request that the digital content be delivered to the first mobile device for a second time. For example, the media content may have been downloaded to the mobile device, but the media content has been removed or deleted from the device based on the available space on the mobile device and time spent on the device (e.g. age of the media content). In another example, the media content may have been streamed to the mobile device but never stored on the mobile device, and the user wishes to download or stream the media content to the mobile device for a second time.

In some cases a distributor, such as a communication service provider for the mobile device, may facilitate the communication to and from the mobile device with the clearing house, transport providers, and media providers. Additionally, the distributor may handle any payment transactions conducted with the mobile device. In other cases, the mobile device may communicate directly with the clearing house, transport providers, and media providers.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a communication system 100 is described. In an embodiment, the communication system 100 comprises a mobile device 102 comprising a trusted security zone 104, a permissive sector 108, a cellular radio transceiver 120, an identifier 126, and an optional user interface 118. In an embodiment, the trusted security zone 104 comprises one or more secure applications 106. The permissive sector 108 may comprise one or more device applications 110. The mobile device 102 may engage in a variety of communication exchanges. The mobile device 102 may comprise a variety of devices such as a mobile phone, a personal digital assistant (PDA), a media player, a laptop computer, a tablet computer, and other electronic devices having a macro cellular radio transceiver. Some embodiments of the disclosure may also comprise stationary electronic devices, such as a home entertainment system or other similar devices operable to present multimedia content. Such stationary devices may be coupled to a network 131 by either a wired communication link or a wireless communication link.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile device 102 may couple to the network 131 by a variety of communication paths. The mobile device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. In some embodiments, the mobile device 102 may communicate with the base transceiver station (BTS) 132 via the cellular radio transceiver 120 of the mobile device 102. The wireless link between the mobile device 102 and the base transceiver station 132 may couple the mobile device 102 to the network 131.

As described above, the trusted security zone 104 may be provided by a physically separate processor or by a virtual processor. The one or more secure applications 106 may be any of a variety of applications that process and/or transmit confidential information. The confidential information may comprise sensitive business documents such as electronic mail, marketing literature, business plans, client lists, addresses, employee data, intellectual property documents, and the like. The confidential information may comprise personal medical records or medical data that are subject to privacy requirements enforced by government regulatory bodies or commercial standards. The confidential information may comprise financial information such as account numbers, authentication identities, account balance information, and the like. The confidential information may comprise digital rights information, such as rights for multimedia content, for example.

When processing and/or transmitting the confidential information, the secure application 106 executes at least partially in the trusted security zone 104. It is a characteristic or feature of the trusted security zone 104, as described more fully above, that when a secure application 106 executes in the trusted security zone 104, untrusted applications are prevented from executing and/or accessing trusted memory partitions and/or accessing the display, communication interfaces, or input devices of the mobile device 102, thereby reducing the opportunity for malware that may have infiltrated the mobile device 102 to corrupt or to monitor the confidential information.

In an embodiment, the trusted security zone 104 may be provided in a secure area of a processor and/or memory chip shared with the permissive sector 108 or in a separate processor and/or memory chip. The trusted security zone 104 may be provided as what may be conceptualized as "invisible space." In an embodiment, at least some of the memory addresses occupied by the trusted security zone 104 may be inaccessible to device applications 110 executing out of permissive sector 108. This demarcation of accessible memory addresses versus inaccessible memory addresses may be provided by the operating system of the mobile device 102. In an embodiment, the trusted security zone 104 may encapsulate a trusted execution environment (TEE), for example conforming at least partially to the Global Platform 2.0 or later revision trusted execution environment standard.

It is understood, however, that the trusted security zone 104 is contemplated to provide further functionality than that envisioned by the trusted execution environment standards.

In an embodiment, a trust exchange service 112 is provided in the trusted security zone 104. The trust exchange service 112 may be conceptualized as bridging between the permissive sector 108 and the trusted security zone 104. The trust exchange service 112 promotes secure interactions between the applications executing in the permissive sector 108 and applications executing in the trusted security zone 104. The security may be provided using one or more techniques. For example, the trust exchange service 112 may pause a plurality of execution threads when initiating an interaction with the trusted security zone 104, for example while handling a request for service from a secure application 106. This feature may reduce the opportunity that other threads may sniff or otherwise seek to intrude on the operation. For example, the trust exchange service 112 may impose a criteria that all communication between the permissive sector 108 and the trusted security zone 104 be conducted using data that is transformed according to protocols of the trusted security zone 104, for example using encryption and/or using hashing. The trust exchange service 112 may also hide address space in the trusted security zone 104 and/or make the address space inaccessible to the permissive sector 108 without the mediation of the trust exchange service 112.

The device applications 110 executed in the permissive sector 108 may be any of a variety of applications. One of the device applications 110 may be a telephone application that receives dialed digits and attempts to originate a voice call—for example a voice over IP (VoIP) call—to a called telephone. One of the device applications 110 may be a web browser application that requests content from the network 131, for example by sending out a hypertext transport protocol (HTTP) message embedding a universal reference locator (URL). One of the device applications 110 may be a media player that requests streaming or downloading media from the network 131. Many of the device applications 110 may depend upon communication service provided by an IMS network to deliver their functionality to an end user of the mobile device 102. One of the device applications 110 may comprise a mobile transaction interface, where a user may complete a purchase using the application, and secure information, such as credit card information, may be communicated through the application.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of a device application 110 and/or a secure application 106. Additionally, a user may receive communication from the mobile device 102 via the user interface 118, such as phone calls, text messages, messages, emails, contact information, caller identification, call history, internet access, etc. A user may additionally employ the user interface 118 for viewing and/or listening to media such as music, movies, shows, videos, photos, games etc.

In an embodiment, the mobile device 102 may be operable to store and present digital content, wherein the digital content may comprise media content, which may be downloaded to the mobile device 102 from one or more media provider 134 (or digital content data store) and/or may be streamed from a media provider 134. In some embodiments, the media content may be stored as downloaded media 122 in either the permissive sector 108 or the trusted security zone 104 of the mobile device 102. In some embodiments, the mobile device 102 may receive media content from one or more transport provider 138, wherein the transport provider 138 may be operable to facilitate the communication of media content from a media provider 134 (or digital content store) to the mobile device 102. Additionally, the mobile device 102 may comprise a media player 115 operable to present media content such as video, audio, movies, shows, music, games, photos, and/or graphics. As shown in FIG. 1, the media player 115 may, in some embodiments, be executed in the permissive sector 108 of the mobile device 102. Alternatively, the media player 115 may also be executed in the trusted security zone 104 of the mobile device 102 (shown with a dashed outline).

In an embodiment, the downloaded media 122 and media player 115 may be stored in the permissive sector 108, the trusted security zone 104, or a combination of both. Any combination of storing the downloaded media 122 and/or media player 115 is contemplated, wherein they may be stored completely in the permissive sector 108, completely in the trusted security zone 104, or partly in both the permissive sector 108 and the trusted security zone 104. Also, the downloaded media 122 and media player 115 are not dependent on each other for storage location; one may be stored (in full or in part) in the permissive sector 108 while another is stored (in full or in part) in the trusted security zone 104. While the downloaded media 122 and media player 115 may be stored in the permissive sector 108 of the mobile device 102, they are shown as optionally stored in the trusted security zone 104 by a dashed outline. Additionally, interaction between the downloaded media 122 and media player 115 may occur in the permissive sector 108 and/or the trusted security zone 104.

In some embodiments, a user of the mobile device 102 may purchase the rights to digital content or media content. One or more digital rights keys 124 may be obtained, wherein the key(s) 124 may be associated with the digital rights for the media content and may allow access to the media content. In some embodiments, the digital rights keys 124 may be varied, wherein different keys 124 may allow different functions or different access. In some embodiments, the digital rights keys 124 may be provided by one or more media provider 134. Media providers 134 may include movie studios, music studios, video game companies, electronic commerce companies, and/or other digital media vendors or sources. Media providers 134 may include companies such as 20th Century Fox, RKO Pictures, Paramount Pictures, Warner Bros., Metro-Goldwyn-Mayer, Universal Pictures, Columbia Pictures, United Artists, Universal Music Group, Sony Music Entertainment, Warner Music Group, iTunes, Amazon.com, Rhapsody, Xbox LIVE, Netflix, Hulu, and other similar companies.

In some embodiments, a user may be registered with the media provider 134 or may have an account, profile, or subscription with one or more media providers 134. For example, a user may have a communications service subscription account which may be associated with the mobile device 102, and may comprise payment information, such as credit card information, owned by the user. In some embodiments, any payment transaction completed between the user and the media providers 134 and/or transport providers 138, may be completed by billing the communications service subscription account associated with the mobile device 102 or user of the mobile device 102.

In some embodiments, the mobile device 102 may communicate with a clearing house 136, which may also be known as a digital content distribution system. The clearing house 136 may be operable to store the digital rights keys 124 obtained (or purchased) by the user of the mobile device 102, wherein the digital rights keys 124 may be associated with the identifier 126 of the mobile device 102. The identifier 126 may comprise one or more of: an identification of a subscriber (or user), a token, or an identity of the mobile device 102. In some embodiments, the clearing house 136 may facilitate communication between the mobile device 102 and the one or more media providers 134. In some embodiments, the clearing house 136 may be operable to communicate with a plurality of mobile devices 102 and store any number of digital rights keys 124, wherein each key 124 may be associated with an identifier 126 for one or more of the plurality of mobile devices 102 or users of the mobile devices 102. In some embodiments, each key 124 may be associated with more than one identifier 126, for example if a user owns or operates more than one mobile device 102 and associates the multiple mobile devices 102 with the one digital rights key 124.

In alternative embodiments, the one or more digital rights keys 124 may be downloaded directly to the mobile device 102, wherein the keys 124 may allow the mobile device 102 to access the media content. The mobile device 102 may be operable to communicate the digital rights key(s) 124 and/or a token associated with the digital rights key 124 to the clearing house 136 and/or media provider 134 to provide verification that (the user of) the mobile device 102 is authorized to access the media content associated with the key 124. In some embodiments, the digital rights keys 124 may be stored within the trusted security zone 104 of the mobile device 102, wherein the trusted security zone 104 may control the communication of data stored in the trusted security zone 104, such as the digital rights keys 124, as described above.

In some embodiments, one or more digital rights keys 124 may be obtained from the one or more media providers 134 and transferred to the mobile device 102 and/or the clearing house 136. Alternatively, a separate digital rights provider 140 may communicate the digital rights keys 124 to the mobile device 102 and/or clearing house 136. In some embodiments, the media provider(s) 134 may communicate with the digital rights provider 140 via a wired or wireless connection.

After the purchase of the digital rights for the digital or media content, a user may request delivery of the content to the mobile device 102. In some embodiments, the clearing house 136 may facilitate delivery of the media content to the mobile device 102 via the one or more media providers 134 and/or one or more transport providers 138. The clearing house 136 may receive a delivery request from the mobile device 102, wherein the request may comprise the identifier 126. The clearing house 136 may then verify that the digital rights key 124 for the requested media content is associated with the provided identifier 126 before authorizing the delivery of the media content to the mobile device 102. In some embodiments, transport providers 138 may be operable to facilitate the transport or delivery of the media content to the mobile device 102. In some embodiments, transport or delivery may comprise downloading and/or streaming the digital or media content to the mobile device 102, wherein the mobile device 102 may be operable to present the media via a media player 115 or other similar interface.

In some embodiments, transport or delivery may incur a transport cost, wherein a user may complete a purchase transaction for the transport. The purchase transaction may be completed by billing a communications service subscription account of the user and/or mobile device. In some embodiments, delivering content may be bifurcated into authorizing access to the content based on a digital rights management solution and delivering the content, wherein a user may be charged separately for the digital rights to access the content and for the transport of the content to his or her device. Additionally, billing the communications service subscription account for transport may provide one or more of the following: a one-time transport, a set number of transports, a set time frame for transports, transport to one device, and transport to a set number of devices. In some embodiments, transport costs may be included in the purchase cost of the digital rights.

In some embodiments, before delivering the media content to the mobile device 102, options for delivery may be communicated to the mobile device 102. These options may comprise media providers and transport providers. For example, different media providers 134 may be available to provide the media content, and different transport providers 138 may be available to provide transport of the media content to the mobile device 102, wherein the cost of delivery may vary between media providers 134 and transport providers 138. Additionally, options may comprise cost associated with delivery, forms of delivery, and time frames associated with delivery. For example, the cost associated with delivery of the media content may be based on other options, such as the form of delivery and time frame (or speed) of delivery, among other variables. A user may wish to have to the content as soon as possible, and may therefore choose a high cost, high speed option to obtain the media content. Alternatively, the user may wish to have the content in several hours or by the next day, and therefore may choose a lower cost, slower delivery option. Additionally, the cost may vary between the different forms of delivery, wherein downloading the media content may have a higher cost than streaming the media content over the air. Also, the cost of delivery may depend on the location of the mobile device 102 and the connection of the mobile device 102 to the network 131. A user may make a selection of the options, wherein the selection may be communicated to the clearing house 136, media provider 134, and/or transport provider 138 to complete the delivery according to the selection. Additionally, based on the cost associated with delivery, a purchase transaction may be completed, wherein the transaction comprises billing the communications service subscription account of the user and/or mobile device 102.

In other embodiments, an optimal procedure for delivery of the digital content may be determined by the clearing house, transport provider, media provider, and/or another similar entity, wherein the procedure includes source (e.g. media provider), path (e.g. transport provider), format (e.g. downloading or streaming), cost, and time frame. Additionally, the optimal delivery procedure may be presented to a user by the mobile device 102 for confirmation and/or alteration before the delivery of the media content.

In some embodiments, a user may request the media content to be delivered to a second mobile device 102, wherein the media content may have already been delivered to a first mobile device 102. The user may have purchased the rights for the media content, wherein the digital rights key 124 may be stored on the mobile device 102 or the clearing house 136. The user may communicate with the clearing house 136 from a second mobile device, communicating an identifier 126 to the clearing house 136. In some embodiments, the identifier 126 may be associated with the user of the mobile device 102. The clearing house 136 may then verify that the identifier 126 is associated with the digital rights key 124 stored in the clearing house 136. Then, the clearing house 136 may facilitate the delivery of the media content via the one or more transport providers 138 and/or media providers 134, as described above. In some embodiments, the media provider 134 and/or transport provider 138 may charge the user for the delivery of the media content to the second mobile device 102. In other words, the user may pay a transport cost for the delivery of the media content. In some embodiments, the payment may comprise billing the communications service subscription account of the user for transport to the second mobile device.

In some embodiments, a user may request delivery of the media content to the first mobile device 102 for a second (or subsequent) time, wherein the media content may have been previously delivered to the mobile device 102 but is not stored on the mobile device 102. For example, the media content may have been downloaded to the mobile device 102, but a user may have removed or deleted the media content to create space on the mobile device, or the media content may have been removed automatically based on the available space on the mobile device 102 and time spent on the device 102. In another example, the media content may have been streamed to the mobile device 102 but never stored on the mobile device 102 as downloaded media 122. Therefore, the user may wish to download or stream the media content to the mobile device 102 for a second time.

In some embodiments of the disclosure, steps may be taken to deliver the media content to any number of mobile devices 102 any number of times, wherein a user of the mobile devices 102 may request delivery and provide indication of ownership of the digital rights for the media content for each delivery. In some embodiments, transport costs may be charged to the user for each delivery of the media content. The communications service subscription account of the user may be billed for transport, wherein billing may provide one or more of: a one-time transport, a set number of transports, a set time frame for transports, transport to one device, and transport to a set number of devices.

Figure 2A:
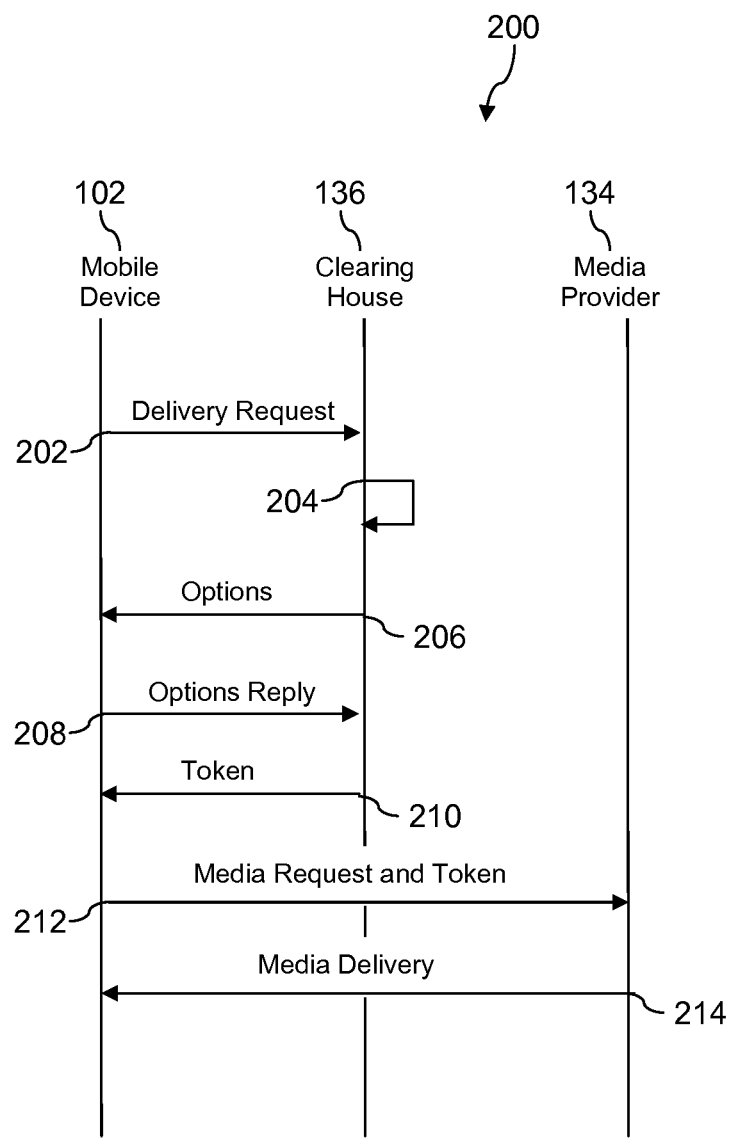
FIG. 2A is a message sequence diagram according to an embodiment of the disclosure.

FIG. 2A illustrates a message sequence 200 (or communication pathway) between the mobile device 102, clearing house 136, and/or media provider 134. In some embodiments, the message sequence 200 may be performed over a network 131 illustrated in and described with reference to FIG. 1. In the embodiment shown in FIG. 2A, the message sequence 200 may be performed when the mobile device 102 initially communicates a request for delivery of media content 202 to the clearing house 136, wherein the request comprises an identifier associated with the mobile device 102 and/or the user of the mobile device 102. The clearing house 136 may verify, at label 204, the authorization of the mobile device 102 to access the requested media content, wherein the identifier may be associated with digital rights stored in the clearing house 136. Upon completion of the verification process 204, the clearing house 136 may send an options message 206 to the mobile device 102 presenting options for delivery of the requested media content. The mobile device 102 may receive a selection from a user and send an options reply message 208 to the clearing house 136.

The clearing house 136 may then communicate a token 210 to the mobile device 102, wherein the token 210 may comprise credentials and/or permission for accessing the requested media content as well as information about the selection of one or more options. The mobile device 102 may then send a media request 212 to the media provider 134 and communicate the token 212 to the media provider 134. Then, the media provider 134 may deliver 214 the requested media content to the mobile device 102 via downloading and/or streaming.

Figure 2B:
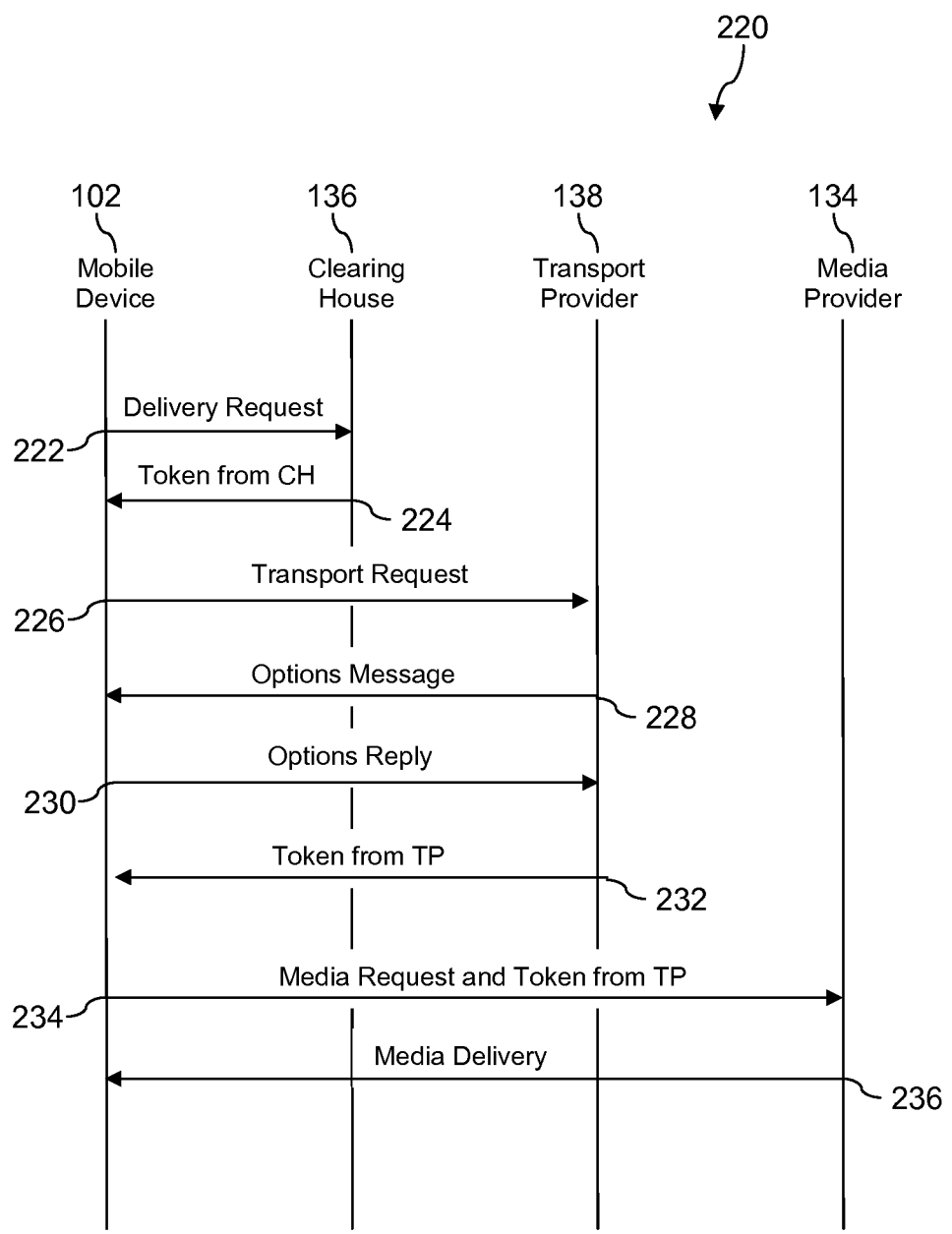
FIG. 2B is another message sequence diagram according to an embodiment of the disclosure.

FIG. 2B illustrates a message sequence 220 (or communication pathway) between the mobile device 102, clearing house 136, media provider 134, and/or transport provider 138. In some embodiments, the message sequence 220 may be performed over a network 131 illustrated in and described with reference to FIG. 1. In the embodiment shown in FIG. 2B, the message sequence 220 may be performed when the mobile device 102 initially communicates a request for delivery of media content 222 to the clearing house 136, wherein the request comprises an identifier associated with the mobile device 102 and/or the user of the mobile device 102. The clearing house 136 may verify the authorization of the mobile device 102 to access the requested media content, wherein the identifier may be associated with digital rights stored in the clearing house 136. The clearing house 136 may then communicate a token 224 to the mobile device 102, wherein the token 224 may comprise credentials and/or permission for accessing the requested media content. The mobile device 102 may then send a transport request 226 to the transport provider 138 and communicate the token 224 received from the clearing house 136 to the transport provider 138. Upon receiving the token, the transport provider 138 may send an options message 228 to the mobile device 102 presenting options for delivery of the requested media content. The mobile device 102 may receive a selection from a user and send an options reply message 230 to the transport provider 138. The transport provider 138 may then communicate a token 232 to the mobile device 102, wherein the token 232 may comprise information about the selected options in message 230. The mobile device 102 may then communicate a request for media delivery 234 to the media provider 134, wherein the request may comprise the token 232 from the transport provider 138 and, in some embodiments, may comprise the token 224 from the clearing house 136. Then, the media provider 134 may deliver 236 the requested media content to the mobile device 102 via downloading and/or streaming.

Figure 2C:
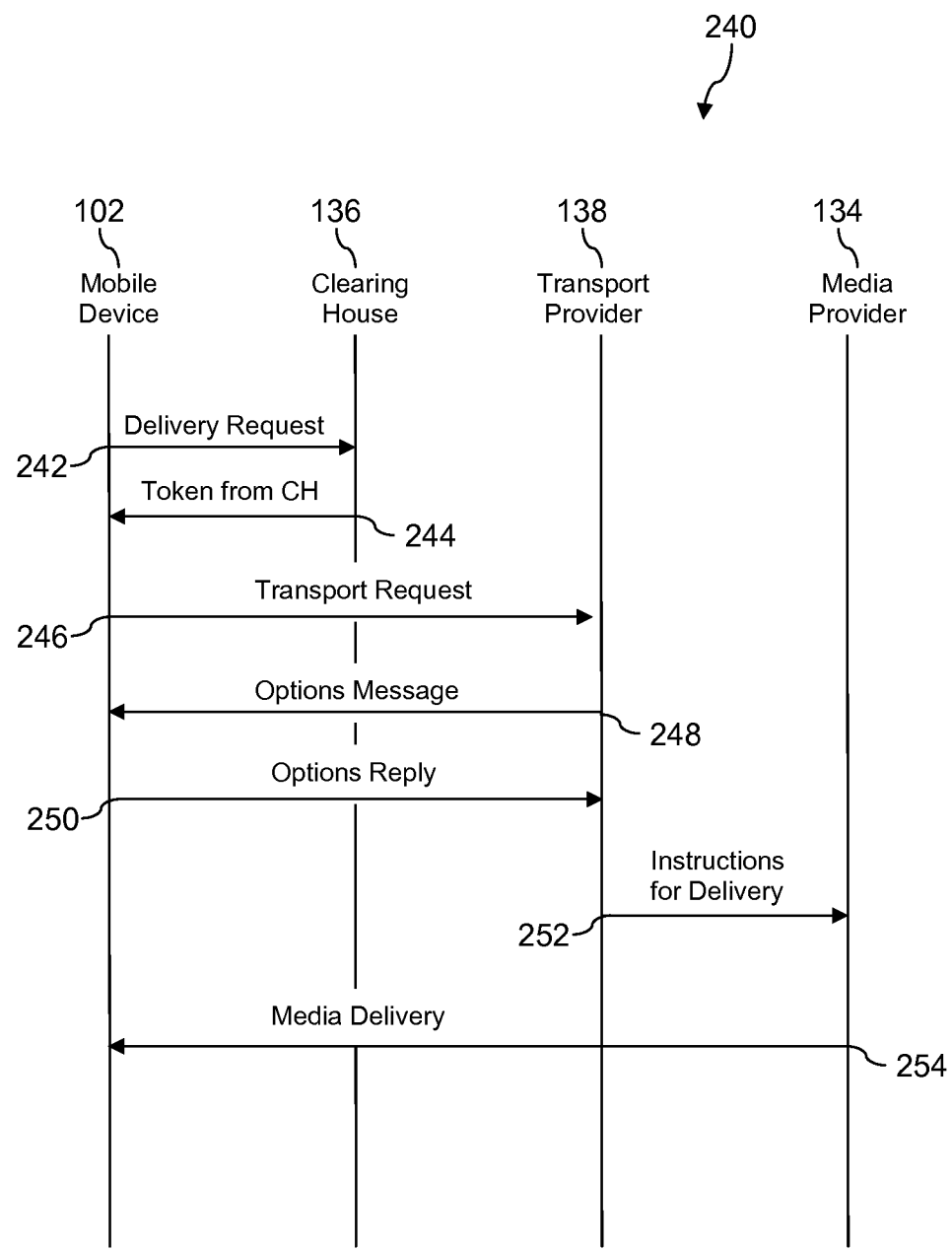
FIG. 2C is yet another message sequence diagram according to an embodiment of the disclosure.

FIG. 2C illustrates a message sequence 240 (or communication pathway) between the mobile device 102, clearing house 136, media provider 134, and/or transport provider 138. In some embodiments, the message sequence 240 may be performed over a network 131 illustrated in and described with reference to FIG. 1. In the embodiment shown in FIG. 2C, the message sequence 240 may be performed when the mobile device 102 initially communicates a request for delivery of media content 242 to the clearing house 136, wherein the request comprises an identifier associated with the mobile device 102 and/or the user of the mobile device 102. The clearing house 136 may verify the authorization of the mobile device 102 to access the requested media content, wherein the identifier may be associated with digital rights stored in the clearing house 136. The clearing house 136 may then communicate a token 244 to the mobile device 102, wherein the token 244 may comprise credentials and/or permission for accessing the requested media content. The mobile device 102 may then send a transport request 246 to the transport provider 138 and communicate the token 244 received from the clearing house 136 to the transport provider 138. Upon receiving the token, the transport provider 138 may send an options message 248 to the mobile device 102 presenting options for delivery of the requested media content. The mobile device 102 may receive a selection from a user and send an options reply message 250 to the transport provider 138. Then, the transport provider 138 may communicate instructions for delivery 252 to the media provider 134 and may facilitate the media delivery 254 from the media provider 134 to the mobile device 102.

Figure 2D:
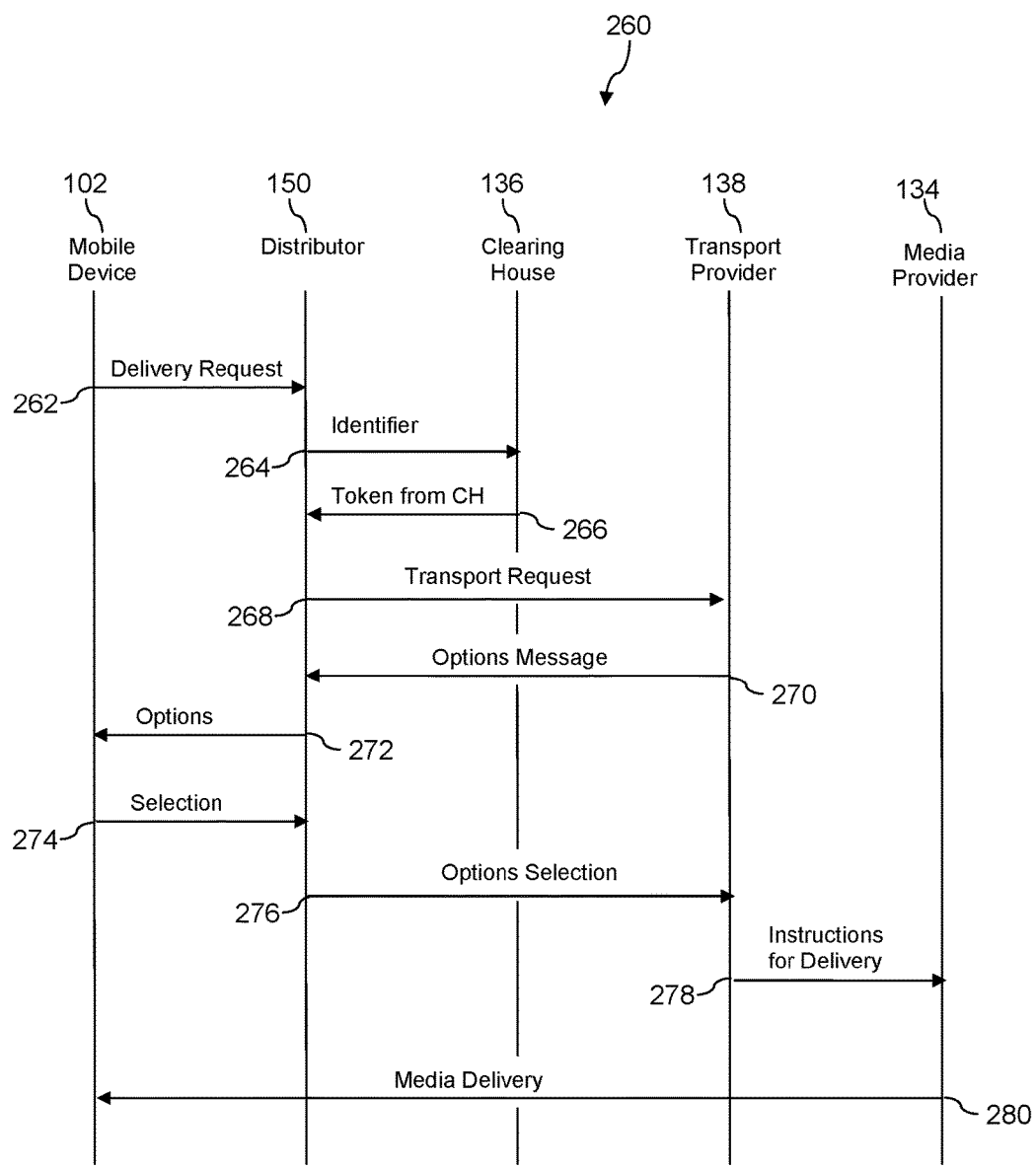
FIG. 2D is yet another message sequence diagram according to an embodiment of the disclosure.

FIG. 2D illustrates a message sequence 260 (or communication pathway) between the mobile device 102, a distributor 150, the clearing house 136, the media provider 134, and/or the transport provider 138, wherein the distributor 150 may be any of a communication service provider for the mobile device 102, the media provider 134, the transport provider 138, or the clearing house 136. In some embodiments, the message sequence 260 may be performed over a network 131 illustrated in and described with reference to FIG. 1. In the embodiment of FIG. 2D, the distributor 150 may facilitate any communication with the mobile device 102 to/from the clearing house 136, the transport provider 138, and/or the media provider 134.

In the embodiment shown in FIG. 2D, the message sequence 260 may be performed when the mobile device 102 initially communicates a request for delivery of media content 262 to the distributor 150, wherein the request comprises an identifier associated with the mobile device 102 and/or the user of the mobile device 102. The distributor 150 may then communicate the identifier 264 to the clearing house 136 to be verified. The clearing house 136 may verify the authorization of the mobile device 102 to access the requested media content, wherein the identifier may be associated with digital rights stored in the clearing house 136. The clearing house 136 may then communicate a token 266 to the distributor 150, wherein the token 266 may comprise credentials and/or permission for accessing the requested media content. The distributor 150 may then send a transport request 228 to the transport provider 138 and communicate the token 266 received from the clearing house 136 to the transport provider 138. Upon receiving the token, the transport provider 138 may send an options message 270 to the distributor 150, wherein the distributor 150 may then present options for delivery of the requested media content 272 to the mobile device 102.

The mobile device 102 may receive a selection from a user and send a selection message 274 to the distributor 150, wherein the distributor 150 may then send the selection message 276 to the transport provider 138. Then, the transport provider 138 may then communicate instructions for delivery 278 to the media provider 134 and the distributor 150 may facilitate the media delivery 280 from the media provider 134 to the mobile device 102. Alternatively, the distributor 150 may communicate the instructions for delivery 278 to the media provider 134. FIGS. 2A-2D illustrate different embodiments, wherein the embodiments may provide different advantages and may be used in different situations. Additionally, other message sequences or communication pathways involving the mobile device 102, clearing house 136, transport providers 138, media providers 134 and distributors 150 may be contemplated, wherein the message sequence or communication pathway may be chosen based on an individual circumstance.

Figure 3A:
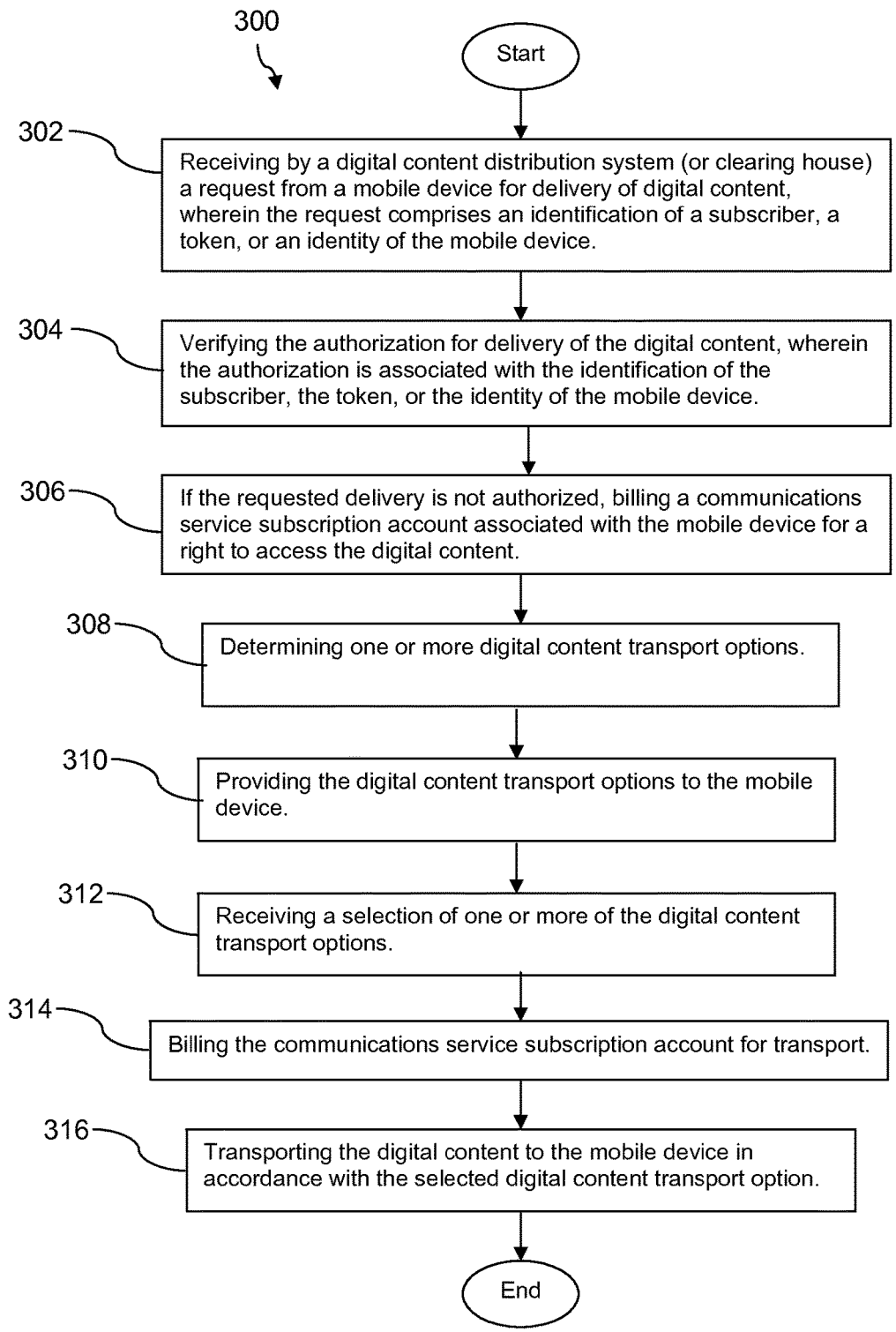
FIG. 3A is a flow chart illustrating a method according to an embodiment of the disclosure.

Turning now to FIG. 3A, a method 300 for delivering digital content is described. The method 300 comprises, at block 302, receiving by a digital content distribution system (or clearing house) a request from a mobile device for delivery of digital content, wherein the request comprises an identification of a subscriber, a token, or an identity of the mobile device. Then, at block 304, the method 300 comprises verifying the authorization for delivery of the digital content, wherein the authorization is associated with the identification of the subscriber, the token, or the identity of the mobile device. In some embodiments, authorization may be provided by the association of digital rights for the digital content with the identification of the subscriber, the token, or the identity of the mobile device by the digital content distribution system. At block 306, if the requested delivery is not authorized, the method 300 comprises billing a communications service subscription account associated with the mobile device for a right to access the digital content. Then, at block 308, the method 300 comprises determining one or more digital content transport options.

At block 310, the method 300 comprises providing the digital content transport options to the mobile device. In some embodiments, the digital content transport options may comprise media providers, transport providers, cost associated with delivery, form of delivery, and time frame associated with delivery. At block 312, the method 300 comprises receiving a selection of one or more of the digital content transport options. In some embodiments, the mobile device communicates with the selected media provider via the chosen transport provider. Then, at block 314, the method comprises billing the communications service subscription account for transport. In some embodiments, billing the communications service subscription account for transport provides one or more of: a one-time transport, a set number of transports, a set time frame for transports, transport to one device, and transport to a set number of devices. Then, at block 316, the method 300 comprises transporting the digital content to the mobile device in accordance with the selected digital content transport option. In some embodiments, transporting the digital content to the mobile device is completed through a direct communication between the mobile device and a digital content data store.

In some embodiments, wherein the mobile device is a first mobile device, the method 300 may further comprise: receiving a request for delivery of the digital content to a second mobile device; verifying the authorization for delivery of the digital content; and transporting the digital content to the second mobile device. Additionally, the method 300 may further comprise billing the communications service subscription account for transport to the second mobile device. In some embodiments, the method 300 may further comprise determining the optimal procedure for delivering the digital content, wherein the procedure includes source, path, format, cost, and time frame.

Figure 3B:
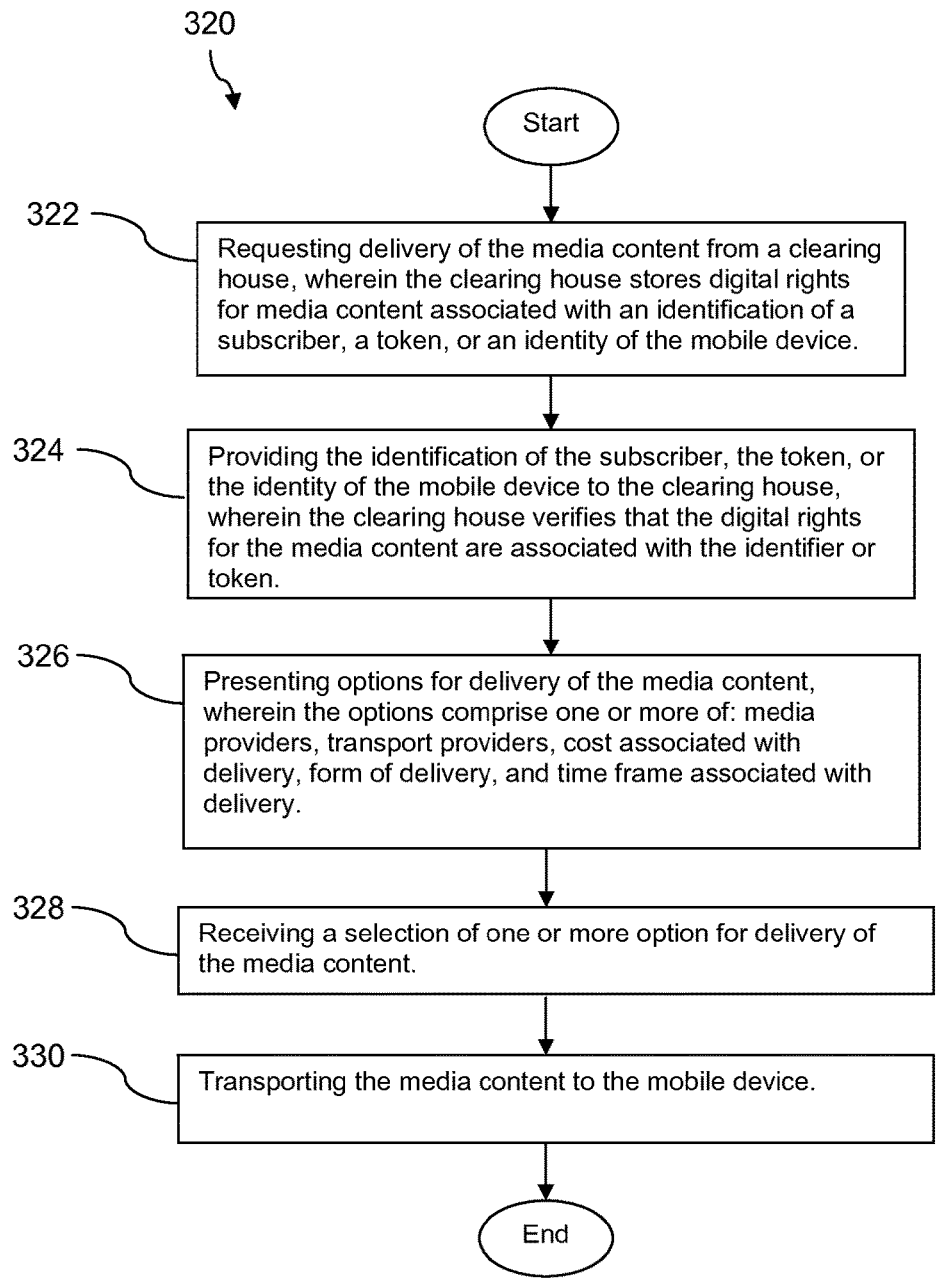
FIG. 3B is a flow chart illustrating another method according to an embodiment of the disclosure.

Turning now to FIG. 3B, a method 320 for transporting media content to a mobile device is described. At block 322, the method 320 comprises requesting delivery of the media content from a clearing house, wherein the clearing house stores digital rights for media content associated with an identification of a subscriber, a token, or an identity of the mobile device. At block 324, the method 320 comprises providing the identification of the subscriber, the token, or the identity of the mobile device to the clearing house, wherein the clearing house verifies that the digital rights for the media content are associated with the identifier or token. At block 326, the method 320 comprises presenting options for delivery of the media content, wherein the options comprise one or more of: media providers, transport providers, cost associated with delivery, form of delivery, and time frame associated with delivery. At block 328, the method 320 comprises receiving a selection of one or more option for delivery of the media content. Then, at block 330, the method comprises transporting the media content to the mobile device. In some embodiments, after receiving the selection of the one or more option for delivery, the clearing house directs the mobile device to a provider for the one or more option chosen to complete the transport of the media content. In some embodiments, the cost associated with delivery comprises a transport fee, the method further comprising completing a purchase transaction for the transport fee with the chosen transport provider. In some embodiments, the form of delivery comprises downloading or streaming the media content to the mobile device. In some embodiments, the mobile device communicates with the selected media provider via the selected transport provider. In some embodiments, delivering content is bifurcated into authorizing access to the content based on a digital rights management solution and delivering the content, wherein a user may be charged separately for the digital rights to access the content and for the transport of the content to his or her device.

Figure 3C:
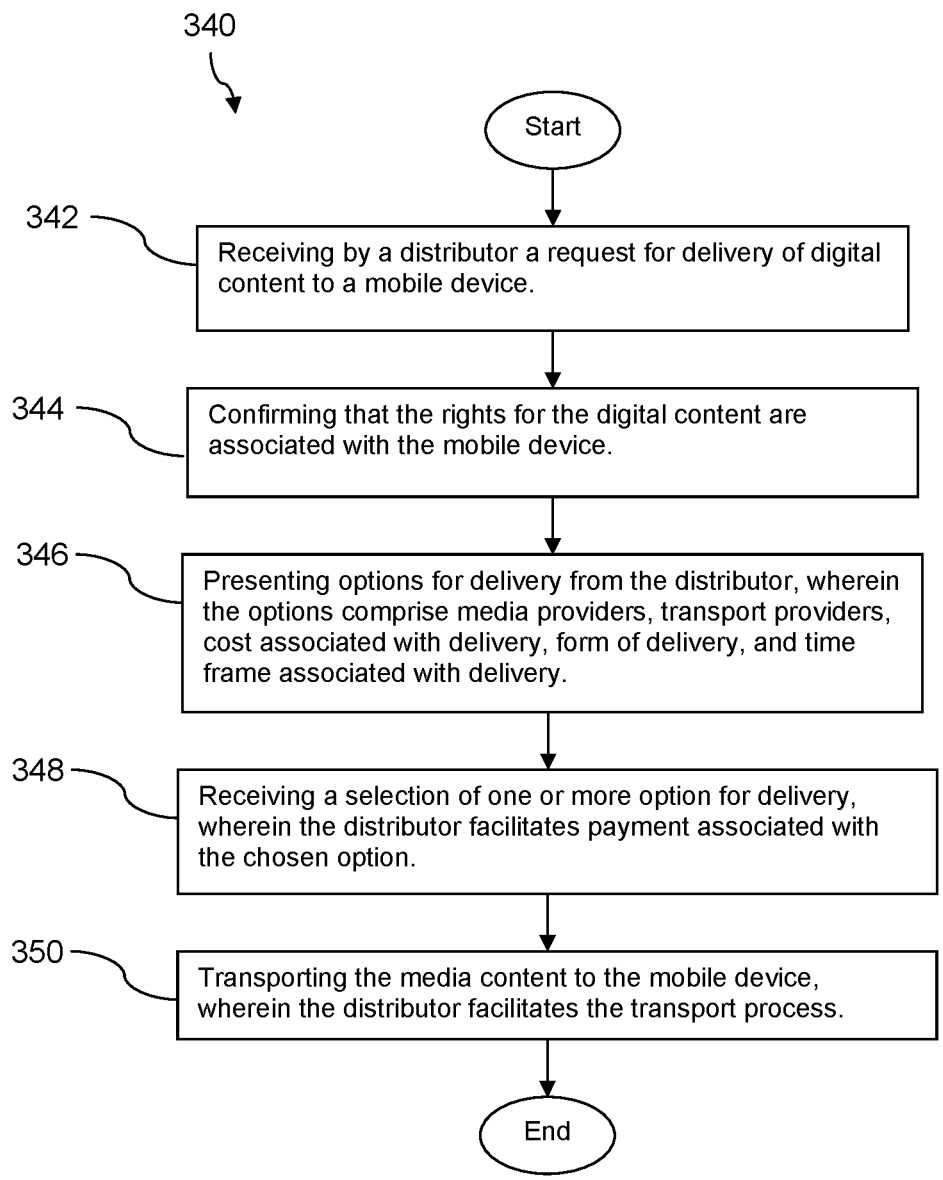
FIG. 3C is a flow chart illustrating yet another method according to an embodiment of the disclosure.

Turning now to FIG. 3C, a method 340 for transporting digital content to a mobile device is described. At block 342, the method 340 comprises receiving by a distributor a request for delivery of digital content to a mobile device. Then, at block 344, the method 340 comprises confirming that the rights for the digital content are associated with the mobile device. In some embodiments, confirming comprises: receiving an identifier for the mobile device, communicating the identifier to a clearing house, and receiving verification from the clearing house that the digital rights for the media content are associated with the identifier. In other embodiments, confirming comprises receiving indication of the digital rights from the mobile device to the distributor. At block 346, the method 340 comprises presenting options for delivery from the distributor, wherein the options comprise media providers, transport providers, cost associated with delivery, form of delivery, and time frame associated with delivery. In some embodiments, the distributor accesses information from the mobile device, including location and personal credentials, to determine options for delivery. At block 348, the method comprises receiving a selection of one or more options for delivery, wherein the distributor facilitates payment associated with the chosen option. Then, at block 350, the method 340 comprises transporting the media content to the mobile device, wherein the distributor facilitates the transport process. In some embodiments, the distributor comprises one of: a communication service provider for the mobile device, a media provider, a transport provider, or the clearing house.

Figure 4:
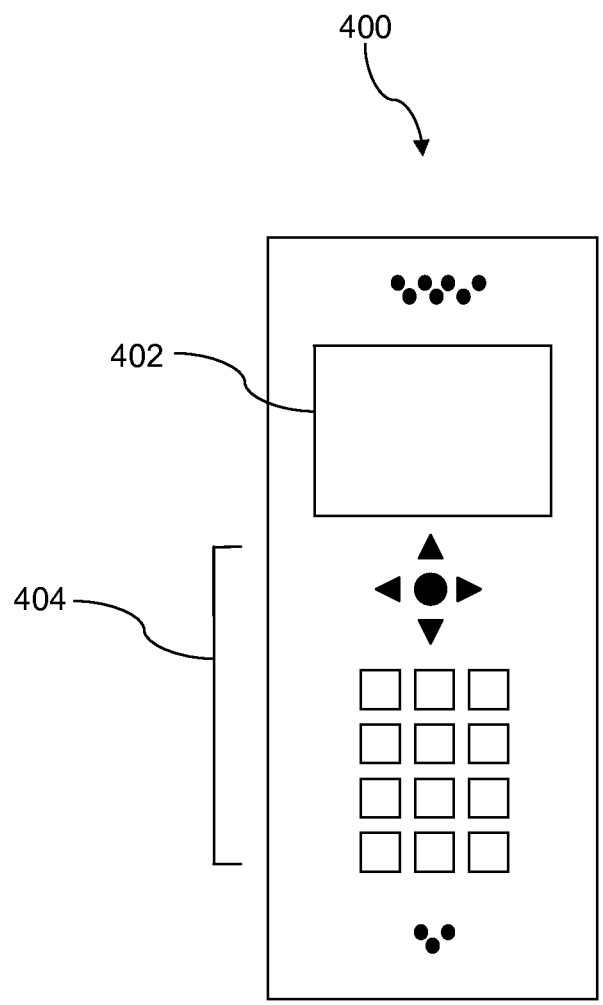
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
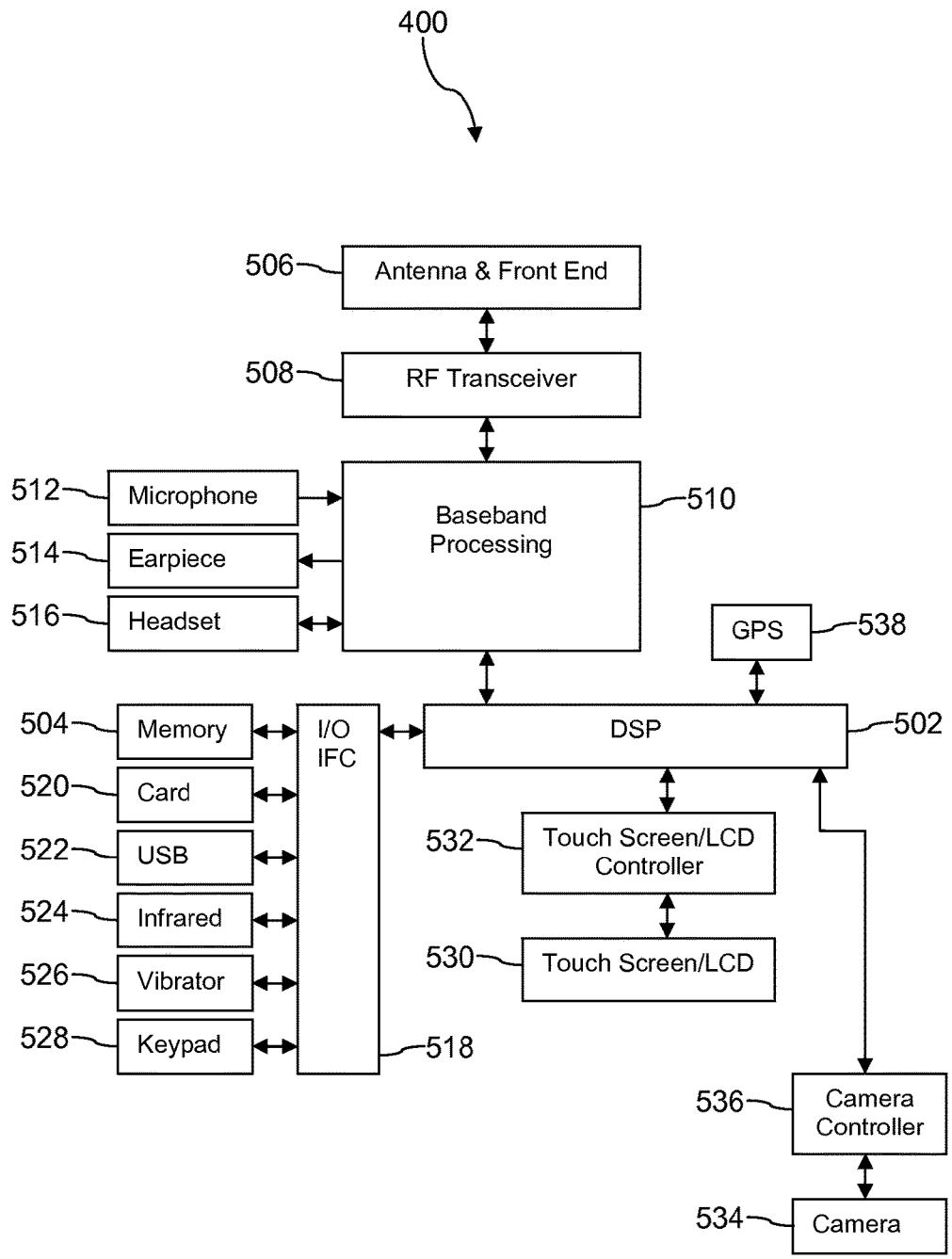
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
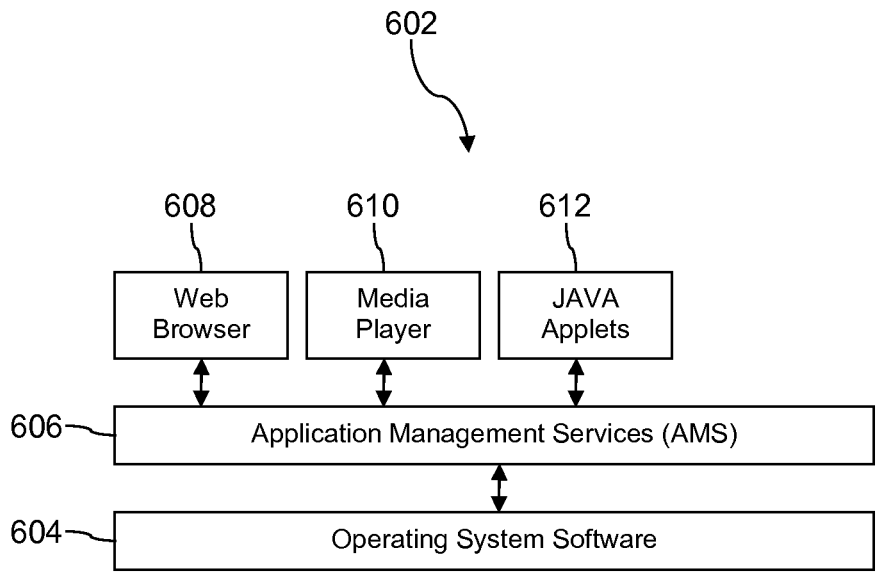
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
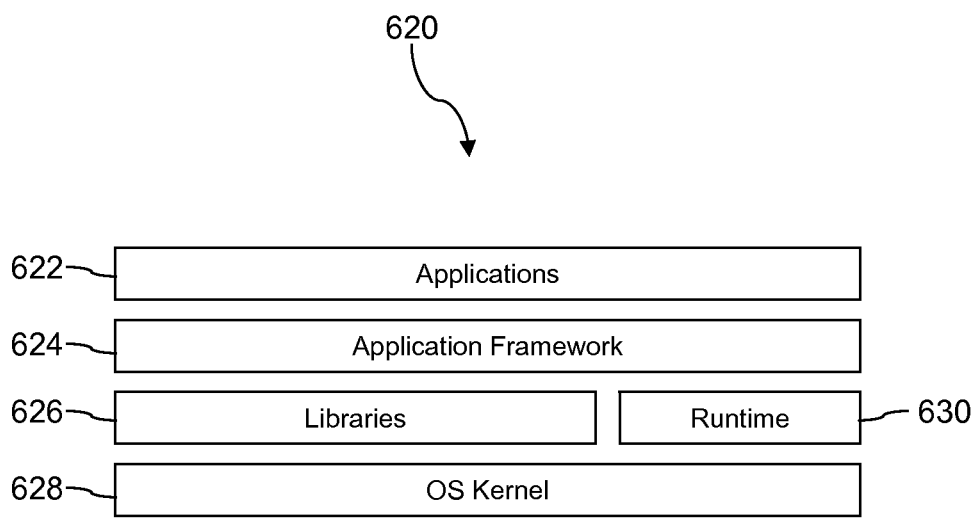
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
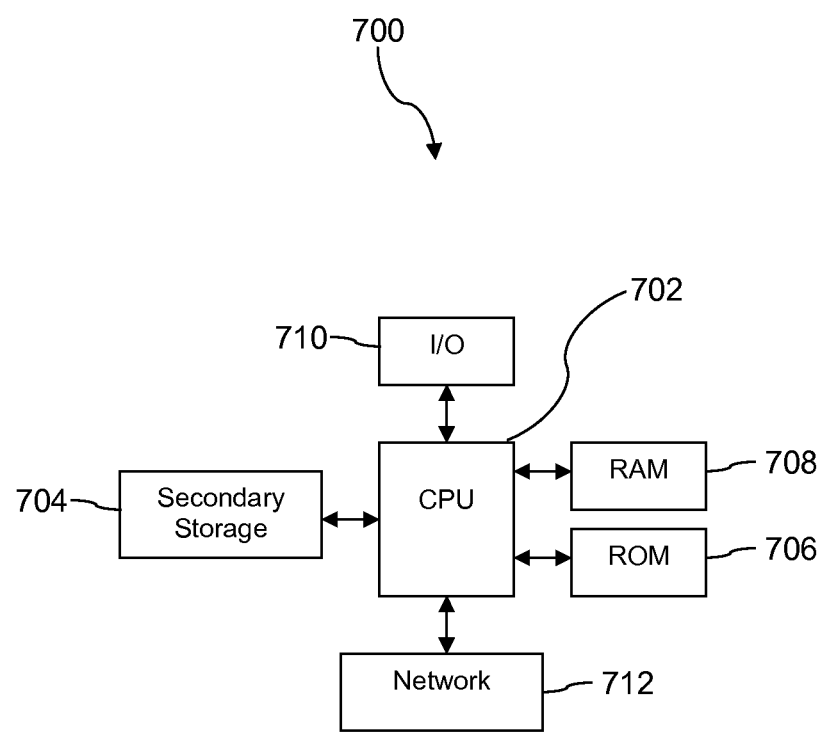
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embedded in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for selecting and delivering digital content to a mobile device by a clearing house for digital content distribution that is independent of a media provider, wherein the method is bifurcated to include authorization for access to the digital content and a separate transport of the digital content to the mobile device, the method comprising:

creating, by the clearing house of a digital content distribution system that is independent of the media provider, and storing, in a non-transitory memory of the clearing house, a plurality of digital rights keys and their associations with a plurality of identifiers of a plurality of mobile devices, wherein each of the plurality of digital rights keys is associated with a corresponding digital right to access a corresponding digital content;

completing a payment transaction with a first mobile device for a right to access digital content by billing a communications service subscription account associated with the first mobile device for the right to access digital content;

receiving, by the clearing house, a request from the first mobile device for delivery of the digital content, wherein the request comprises an identifier including one or more of an identification of a subscriber, an access token, or an identity of the first mobile device;

verifying, by the clearing house, that delivery of the digital content is authorized by determining that the identifier is associated with a digital rights key for the digital content stored in the non-transitory memory of the clearing house;

in response to the clearing house verifying that delivery of the digital content is authorized:

determining, by the clearing house or a transport provider, one or more digital content transport options for the first mobile device;

providing, by the clearing house or the transport provider, the digital content transport options to the first mobile device;

receiving, by the clearing house or the transport provider, a selection of at least one of the digital content transport options from the first mobile device;

completing a payment transaction with the first mobile device for transport of the digital content to the first mobile device via the at least one of the digital content transport options separately from the payment transaction for the right to access the digital content by billing the communications service subscription account for the transport of the digital content via the at least one of the digital content transport options; and subsequently transporting, via a network based on the at least one of the digital content transport options, the digital content from the media provider to the first mobile device separately from the previously purchased right to access the digital content;

receiving, by the clearing house, a request for delivery of the digital content to a second mobile device;

verifying, by the clearing house, authorization for delivery of the digital content to the second mobile device;

transporting the digital content from the media provider to the second mobile device; and additionally billing the communications service subscription account for transport to the second mobile device, wherein the additional billing is separate from the billing for the right to access the digital content and the billing for the transport of the digital content to the first mobile device.

2. The method of claim 1, further comprising determining, by the clearing house, the media provider, or the transport provider, a preferred procedure for delivering the digital content, wherein the procedure includes source, path, format, cost, and time frame.

3. The method of claim 1, wherein transporting the digital content to the first mobile device is completed through a communication between the first mobile device and a digital content data store of the media provider without involving the clearing house or the transport provider.

4. The method of claim 1, wherein the digital content transport options comprise media providers, transport providers, cost associated with delivery, form of delivery, and time frame associated with delivery.

5. The method of claim 4, wherein the first mobile device selects the media provider and a transport provider from the digital content transport options, and wherein the first mobile device communicates with the selected media provider via the selected transport provider.

6. The method of claim 1, wherein billing the communications service subscription account for transport to the first mobile device provides one or more of: a one-time transport, a set number of transports to the first mobile device, or a set time frame for transports to the first mobile device.

7. A method for selecting and delivering media content to a mobile device by a clearing house for digital content distribution that is independent of a media provider, wherein the method is bifurcated to include authorization for access to the digital content and a separate transport of the digital content to the mobile device, the method, comprising:
    completing, by a first mobile device, a purchase transaction for a right to access media content;
    requesting, by the first mobile device, delivery of the media content from the clearing house of a digital content distribution system that is independent of the media provider, wherein the clearing house stores a plurality of digital rights keys and their associations with a plurality of identifiers of a plurality of mobile devices in a non-transitory memory of the clearing house, and wherein each of the plurality of digital rights keys is associated with a corresponding digital right to access corresponding media content;
    providing, by the first mobile device, an identifier associated with the first mobile device to the clearing house;
    verifying, by the clearing house, that the delivery of the media content is authorized by determining that the identifier is associated with a digital rights key for the media content stored in the non-transitory memory of the clearing house;
    in response to the clearing house verifying that delivery of the digital content is authorized:
        determining and providing, by the clearing house or a transport provider to the first mobile device, media content transport options for the first mobile device;
        presenting, by the first mobile device, the media content transport options for delivery of the media content, wherein the media content transport options comprise one or more of: media providers, transport providers, cost associated with delivery, form of delivery, or time frame associated with delivery;
        receiving, by the first mobile device, a selection of at least one of the media content transport options for delivery of the media content;
        completing, by the first mobile device, a purchase transaction for transport of the media content to the first mobile device via the selected at least one of the media content transport options separately from the purchase transaction for the right to access the digital content; and
        subsequently transporting, via a network based on the selected at least one of the media content transport options, the media content from the media provider to the first mobile device separately from the previously purchased right to access the media content;
    receiving, by the clearing house, a request for delivery of the digital content to a second mobile device;
    verifying, by the clearing house, authorization for delivery of the digital content to the second mobile device;
    transporting the digital content from the media provider to the second mobile device; and
    additionally billing a communications service subscription account associated with the first mobile device for transport to the second mobile device, wherein the additional billing is separate from the purchase transaction for the right to access the digital content and the purchase transaction for the transport of the digital content to the first mobile device.

8. The method of claim 7, wherein, after receiving the selection of the at least one of the media content transport options for delivery, the clearing house directs the first mobile device to a provider for the selected at least one of the media content transport options to complete the transport of the media content.

9. The method of claim 7, wherein the form of delivery comprises downloading or streaming the media content to the first mobile device.

10. The method of claim 7, wherein the first mobile device selects the media provider and a transport provider from the media content transport options, and wherein the first mobile device communicates with the selected media provider via the selected transport provider.

11. A method for selecting and delivering digital content to a mobile device by a clearing house for digital content distribution that is independent of a media provider, wherein the method is bifurcated to include authorization for access to the digital content and a separate transport of the digital content to the mobile device, the method comprising:
    completing, by a first mobile device, a purchase transaction for a right to access digital content;
    receiving, by a distributor, a request for delivery of the digital content to the first mobile device, wherein the request comprises an identifier;
    providing, by the distributor, the identifier to the clearing house of a digital content distribution system that is independent of the media provider, wherein the clearing house stores a plurality of digital rights keys and their associations with a plurality of identifiers of a plurality of mobile devices in a non-transitory memory of the clearing house, and wherein each of the plurality of digital rights keys is associated with a corresponding digital right to access corresponding digital content;
    confirming, by the clearing house, that the delivery of the digital content is authorized by determining that the identifier is associated with a digital rights key for the digital content stored in the non-transitory memory of the clearing house;
    in response to the clearing house confirming that delivery of the digital content is authorized:
        communicating, by the clearing house, a token to the distributor;
        sending, by the distributor, a transport request and the token to a transport provider;
        in response to receiving the token, determining and providing, by the transport provider, digital content transport options for the first mobile device;
        presenting, by the first mobile device from the distributor, the digital content transport options for delivery of the digital content, wherein the digital content transport options comprise one or more of: media providers, transport providers, cost associated with delivery, form of delivery, or time frame associated with delivery;
        receiving, by the first mobile device, a selection of at least one of the digital content transport options for delivery of the digital content, wherein the distributor facilitates payment associated with the at least one of the digital content transport options;

completing, by the first mobile device, a purchase transaction for transport of the digital content to the first mobile device via the selected at least one of the digital content transport options separately from the purchase transaction for the right to access the digital content; and subsequently transporting, via a network based on the selected at least one of digital content transport options, the digital content from the media provider to the first mobile device separately from the previously purchased right to access the digital content, wherein the distributor facilitates the transport process;

receiving, by the clearing house, a request for delivery of the digital content to a second mobile device;

verifying, by the clearing house, authorization for delivery of the digital content to the second mobile device;

transporting the digital content from the media provider to the second mobile device; and additionally billing a communications service subscription account associated with the first mobile device for transport to the second mobile device, wherein the additional billing is separate from the purchase transaction for the right to access the digital content and the purchase transaction for the transport of the digital content to the first mobile device.

12. The method of claim 11, further confirming:

receiving, by the distributor, verification from the clearing house that the identifier is associated with the digital rights key.

13. The method of claim 11, wherein the distributor accesses information including location and personal credentials from the first mobile device to determine the digital content transport options for delivery of the digital content.

14. The method of claim 11, wherein the distributor comprises a communication service provider for the first mobile device.

15. The method of claim 11, wherein the distributor comprises one of: the media provider, a transport provider, or the clearing house.

* * * * *